May 21, 1929.  A. E. R. BLOMQUIST  1,713,592
MANICURING DEVICE
Filed Feb. 8, 1928   3 Sheets-Sheet 3
Fig. 5.
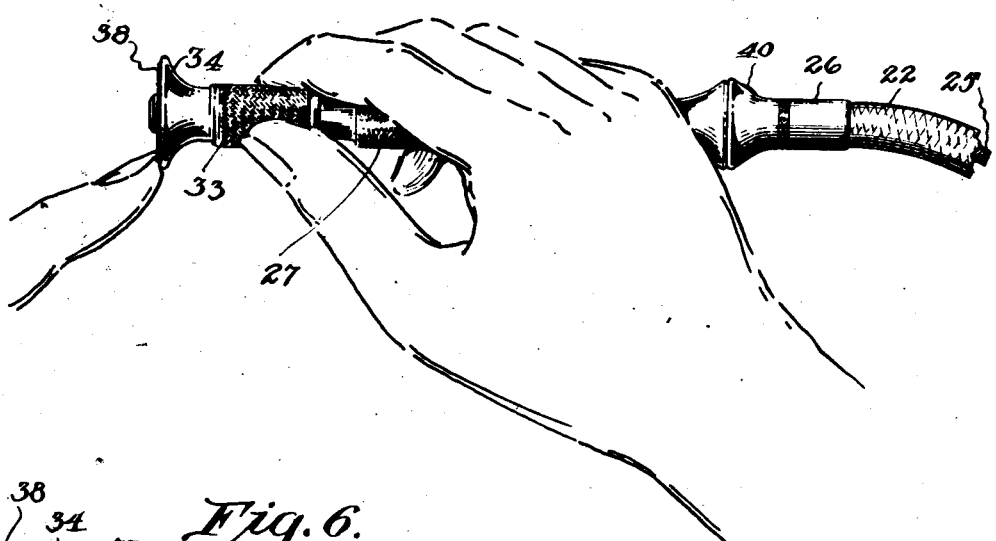
Fig. 6.
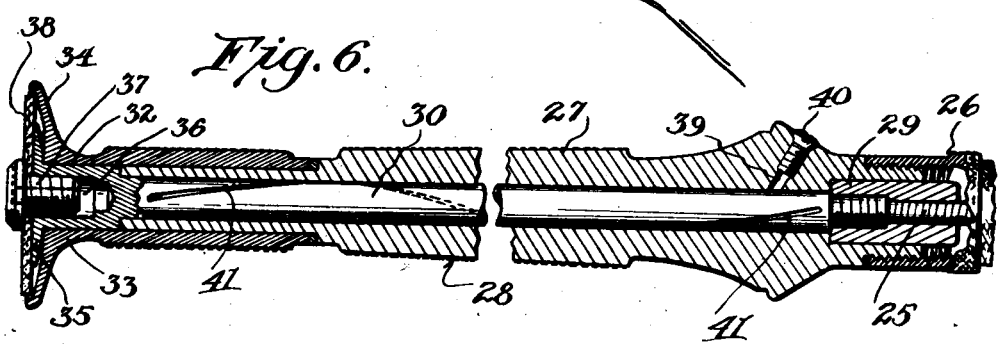
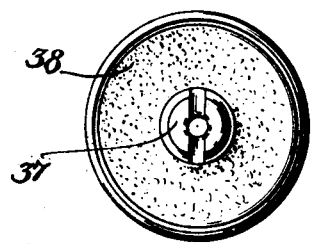
Fig. 7.
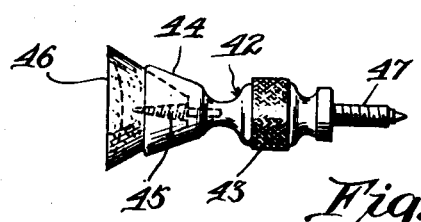
Fig. 8.
Inventor
A. E. R. Blomquist
By Hull, Brock & West
Attorneys Patented May 21, 1929.

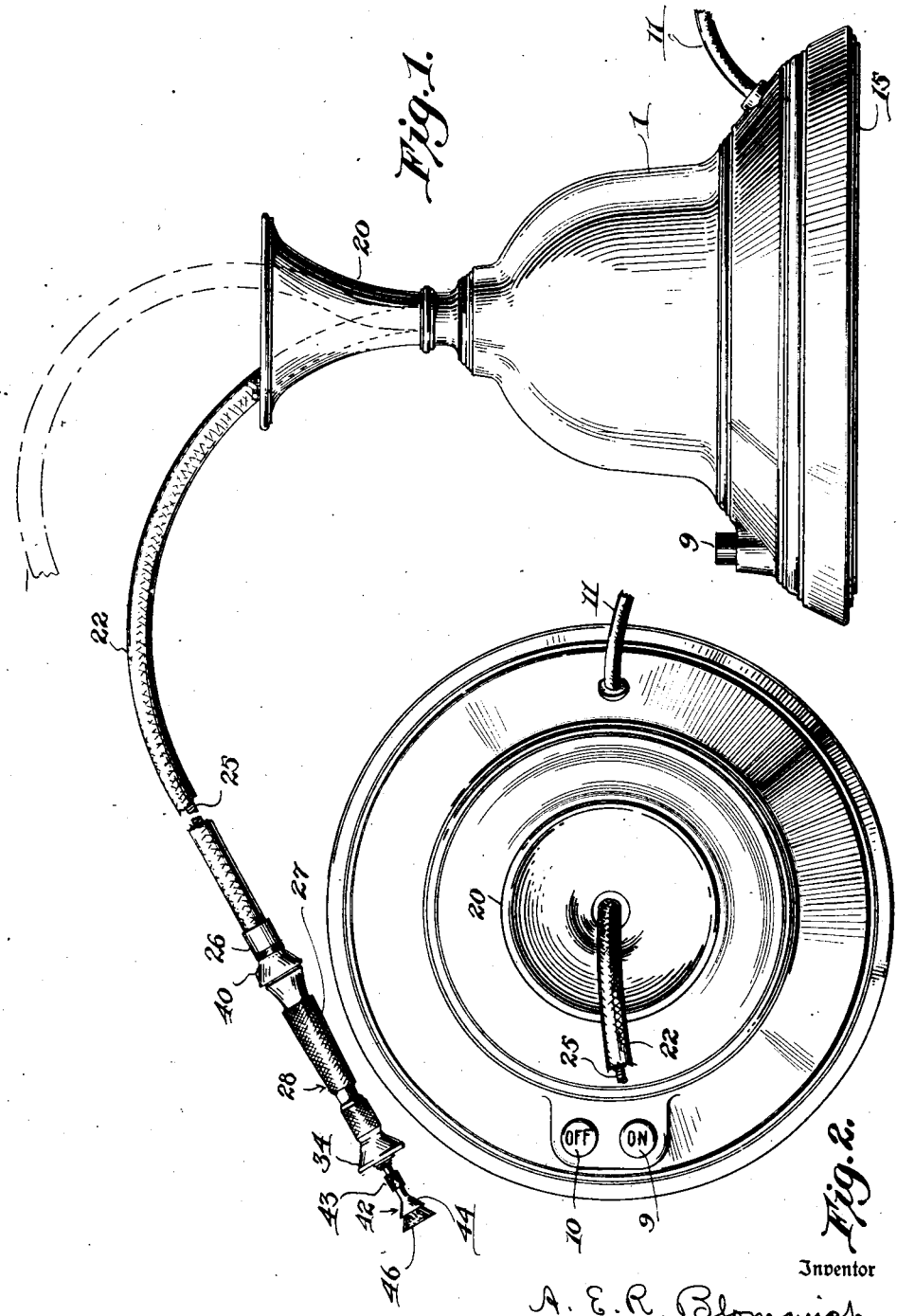

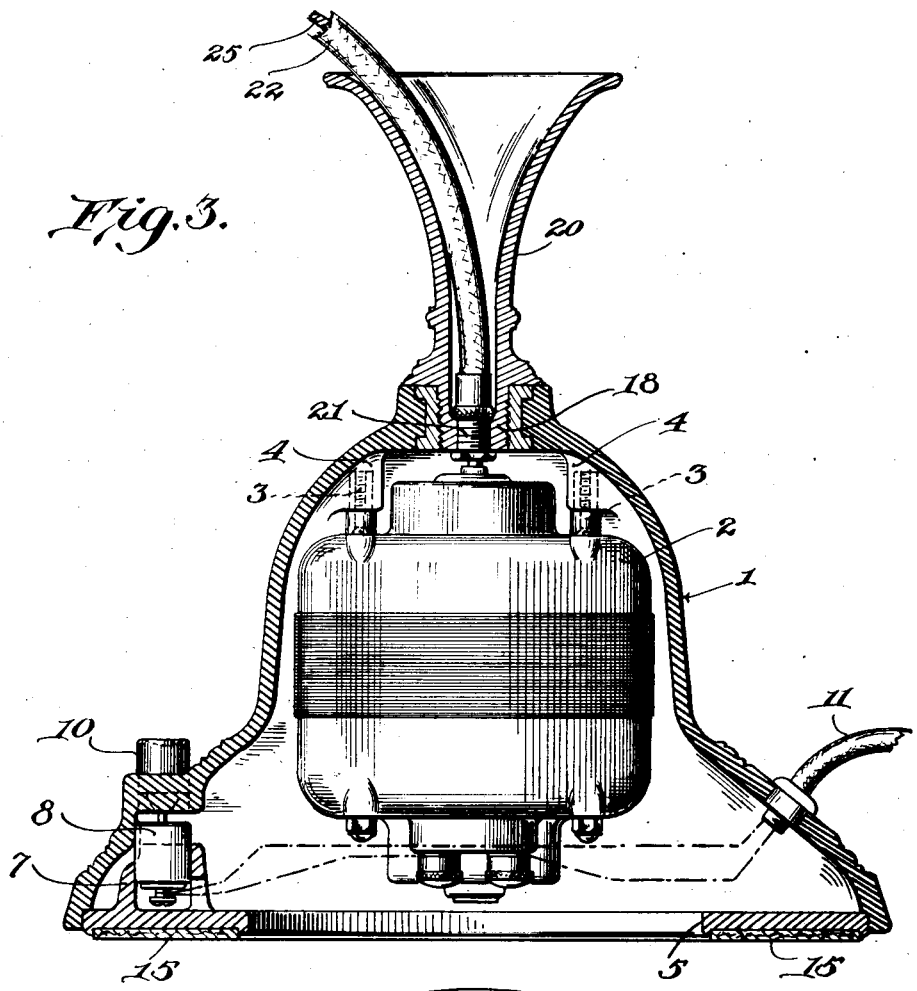
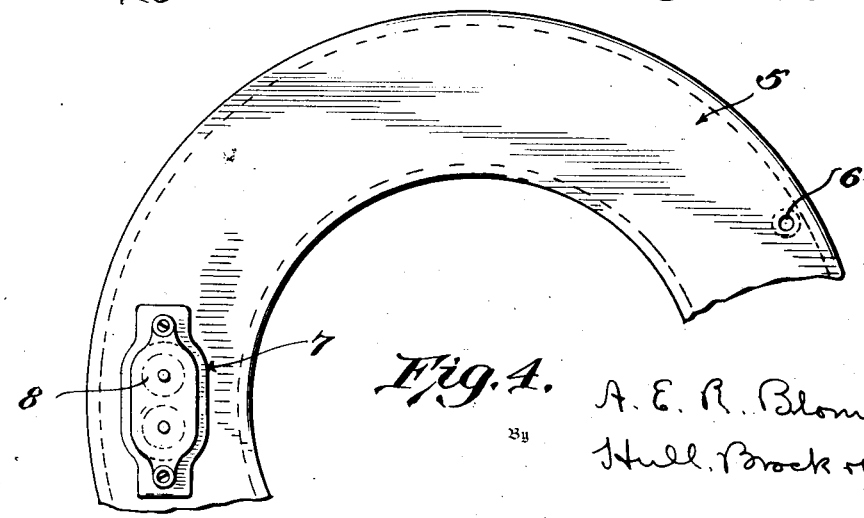

1,713,592

UNITED STATES PATENT OFFICE.

AUGUST E. R. BLOMQUIST, OF CLEVELAND, OHIO.

MANICURING DEVICE.

Application filed February 8, 1928. Serial No. 252,763.

My present invention has to do with improvements in manicuring devices or machines that are especially suitable for use in beauty parlors, barber shops, and like places, and among the more important objects of the invention are to provide a power driven instrument of this class that is compact, and is neat and attractive of appearance so that its presence on a manicurist's stand will not be objectionable; to provide a device of the foregoing nature that is very convenient of use and easy of control; that enables work of the highest quality to be speedily performed; that adjusts itself readily to the natural movements and different positions of the operator's hands while performing the manicuring operations and thus conserves the operator's strength, preventing strain and fatigue; and to provide a power operated manicuring instrument involving a rotary or oscillating guard for contact with the finger adjacent the nail while trimming the latter so that, as will hereinafter more fully appear, the instrument may be caused to move along the nail in any desired relation thereto with absolute precision and always under perfect control of the operator.

Additional objects will appear as I proceed to describe the invention in detail, reference being had to the accompanying drawings wherein Fig. 1 represents a side elevation of my improved manicuring machine; Fig. 2 is a plan view thereof with the flexible shaft broken away and the manicuring instrument omitted; Fig. 3 is a central vertical section through the casing of the machine, the motor being shown in elevation; Fig. 4 is a fragmentary plan of the base ring; Fig. 5 is a view illustrating the manner in which the manicuring instrument is used when trimming a nail; Fig. 6 is an enlarged central section through the manicuring instrument; Fig. 7 is a front end elevation of the same; and Fig. 8 is a side elevation, on the same scale as Figs. 6 and 7, of the buffer attachment for the manicuring instrument.

Describing the invention in detail and by the use of reference characters, 1 designates a bell shaped casing within which an electric motor 2 is supported with the axis of its shaft vertical and coincident with the vertical axis of the casing. The motor is suspended from the top portion of the casing by screws 3 that enter bosses 4 that are shown as integral with the casing. While any suitable material may be employed for the casing, I at present prefer to use what is known to the trade as "bakelite", or a similar substance, and for the purpose of making efficient connections between the several parts of the structure, metal inserts are embedded within the body of the bakelite where screw connections are made, this being in accordance with the usual practice.

A base ring 5, which may also be of bakelite or like material, fits within the bottom of the casing 1 and has its periphery engaged within a rabbeted groove that surrounds the lower edge of the casing. The base ring is held to the casing by screws engaged through apertures 6, one of which appears in Fig. 4. Mounted within a housing 7 that rises from one side of the base ring 5 is an electric switch 8 of standard construction, and the buttons 9 and 10 of the switch extend upwardly through openings in the side of the casing 1. An electric cable 11 enters through an opening in the casing at a point shown as diametrically opposite the switch 8, and carries the conductors which supply current to the motor under the control of the switch 8. The electrical connections are common and require no description. The underside of the base ring is formed with a channel within which an annular pad 15 of felt or other suitable material is cemented.

Screwed into the reduced upper end of the casing 1 is the threaded shank 18 of an upwardly flaring hollow fitting that I will hereinafter refer to a bell 20. The smaller end of the bell has a reduced bore within which is screwed, clamped, or otherwise secured, one terminal 21 of a sheath 22 that houses a flexible shaft 25, said shaft having its corresponding end fastened to the armature shaft of the motor 2.

The opposite terminal 26 of the sheath 22 is secured to the tubular handle 27 of the manicuring instrument designated generally by the reference numeral 28. The corresponding end of the flexible shaft 25 is fastened, through a coupling 29, to a shaft or mandrel 30 that is journaled within the bore of the handle 27. The forward end of the mandrel is formed with a cylindrical head 32 that is of the same external diameter as the reduced forward portion of the tubular handle 27, and journaled upon said forward portion of the handle and upon the head 32 is a sleeve extension 33 of a guard 34. The front face of the guard 34 is dished to form a shallow cavity whose central portion is occupied by a flange 35 of the head 32. This flange serves to maintain the sleeve 33 of the guard in place on the reduced forward end of the handle 27, and the flange, in turn, and which constitutes an integral part of the shaft 30, is held against forward movement by the coupling 29 that is secured to the rear end of the shaft. The coupling 29 rotates within an enlargement of the bore of the handle 27. The head 32 has a threaded, axial recess 36 for the reception of a screw 37, and a circular file or disk of suitable abrasive material, designated 38, is adapted to be clamped between the flange 35 and the head of the screw 37. The edge portion of the guard 34 extends over the periphery of the disk 38, with slight clearance between the parts, and the forward plane of said edge portion is slightly to the rear of the front surface of the disk 38. An oil hole 39 is formed in the rear portion of the handle 27 and is normally closed by a plug 40, and oil introduced through said hole is distributed throughout the length of the shaft 30 by a spiral groove 41 that is formed therein.

A buffer attachment is shown at 42 in Figs. 1 and 8. This device consists of a body portion that has a knurled enlargement 43 at about its longitudinal center and terminates at its forward end in a cup 44 within which is adapted to be removably secured, as by applying it to an axial screw 45, a conical pad 46 of felt or the like. The attachment terminates at its opposite end in a threaded shank 47 that is adapted to be screwed into a threaded bore of the screw 37.

In using the instrument for trimming nails, it is held in about the manner illustrated in Fig. 5, with the knurled portion of the sleeve extension 33 of the guard 34 grasped between the thumb and first finger. The guard is engaged with the finger that is being operated upon adjacent the nail so that the disk 38 may be properly engaged with the edge of the nail, and then by rotating the guard the instrument may be caused to travel along the edge of the nail in accordance with the desires of the operator and at all times under the operator's control. The instrument may be readily shifted in position, not only with respect to the finger that is being treated, but also with respect to the motor casing, the portion of the flexible shaft that rises from the motor being free to swing in any direction within the bell 20.

It will be seen from the foregoing description that my invention provides a machine that greatly expedites and facilitates the work of manicuring nails, the machine being started and stopped at will by the manipulation of the switch buttons 9 and 10 that are in convenient reach of the operator, and by reason of the fact that the anchored end of the flexible shaft is substantially vertically disposed and is held in such position by the flaring bell 20, no appreciable resistance is offered to the movements of the manicuring instrument 28. It is understood that files or disks of abrasive material of different cuts or grades may be employed and easily changed as occasion requires simply by the removal of the screw 37; and when it is desired to polish the nails the buffer attachment 42 may be readily applied without disturbing the filing or abrasive disk 38.

Having thus described my invention, what I claim is:—

1. A manicuring instrument comprising a handle, a flexible shaft connected to one end of the handle, trimming mechanism located at the opposite end of the handle, driving connections between the flexible shaft and said mechanism and carried by the handle, and a guard surrounding the trimming mechanism and rotatably supported by the handle.

2. A manicuring instrument comprising a handle, a mandrel rotatably supported thereby, trimming mechanism located on one end of the handle, a flexible shaft coupled to the opposite end of the handle, driving connections between said mechanism and said shaft, and a guard disposed in operative relation to the trimming mechanism and oscillable with respect to the handle and said trimming mechanism.

3. A manicuring instrument comprising an elongated handle having a longitudinal bore, a mandrel journaled within said bore, driving means connected to one end of the mandrel, an abrasive disk secured to the opposite end of the mandrel, and a circular guard rotatably supported by the handle and having a rim overhanging the periphery of the disk.

4. A manicuring instrument comprising an elongated handle having a longitudinal bore, a mandrel journaled within the bore of the handle, a flexible shaft connected to one end of said mandrel, an abrasive disk secured to the opposite end of the mandrel, the handle having a cylindrical portion inwardly of the abrasive disk, and a circular guard surrounding and overhanging the periphery of the disk and provided with a sleeve extension journaled on said reduced cylindrical portion of the handle.

5. A manufacturing instrument comprising a substantially cylindrical handle having a longitudinal bore, the forward end of said handle being reduced in diameter, a mandrel journaled within the bore of the handle and having a head disposed beyond the forward end thereof and which is of substantially the same diameter as the reduced forward end of the handle, the head terminating at its forward end in an annular flange, an abrasive disk applied to said flange, a circular guard surrounding the head and having a peripheral lip overhanging the edge of the disk and provided with a sleeve extension journaled upon the head of the mandrel and upon the adjacent reduced portion of the handle, and driving means coupled to the end of the mandrel opposite the head thereof.

6. A manicuring instrument comprising an elongated handle having a longitudinal bore, a mandrel journaled within said bore and having an oil groove extending longitudinally thereof, means adjacent one end of the handle for introducing oil into the bore thereof, an abrasive disk carried by one end of the mandrel, a flexible driving shaft coupled to the opposite end of the mandrel, and a guard rotatably carried by the handle in operative relation to the abrasive disk.

7. A manicuring instrument comprising an elongated handle having a longitudinal bore, a mandrel journaled within said bore, a flexible driving shaft coupled to one end of the mandrel, means for detachably connecting an abrasive disk to the opposite end of the mandrel, a polishing head arranged for detachable connection to said means, and a guard rotatably supported by the handle in operative relation to the abrasive disk.

8. In a machine of the character set forth, the combination of a vertically disposed driving shaft, a flexible shaft having one of its ends connected to the driving shaft in axial alignment therewith, and a support having a rim portion through which the flexible shaft extends and that is spaced from and is substantially in axial alignment with the connection between the driving and flexible shafts.

9. In a machine of the character set forth, the combination of driving mechanism incorporating a vertically disposed shaft, an upwardly flaring hollow fitting substantially in axial alignment with said shaft, and a flexible shaft extending downwardly through said fitting and having its end coupled to the first mentioned shaft.

10. In a machine of the character set forth, the combination of a casing, driving mechanism housed within the casing and incorporating a vertically disposed shaft, an upwardly flaring hollow fitting rising from the casing in axial alignment with said shaft, and a flexible shaft extending downwardly through said fitting and having its end coupled to the first mentioned shaft.

11. In a machine of the character set forth, the combination of a bell-shaped casing, a motor housed within said casing and having its shaft coincident with the vertical axis of said casing, a hollow upwardly flaring fitting rising from the casing in axial alignment with the motor shaft, and a flexible shaft extending downwardly through said fitting and having its adjacent end coupled to the motor shaft.

12. In a machine of the character set forth, the combination of a bell-shaped casing, an electric motor supported within the casing with its shaft substantially coincident with the vertical axis of the casing, a flexible shaft having one of its ends connected to the motor shaft adjacent the upper end of the casing, a base fitted within the bottom of the casing, and an electric switch supported by the base adjacent one side thereof, the casing having an opening through which the actuating means of said switch is exposed.

13. In a machine of the character set forth, the combination of an open bottom casing, an electric motor supported within the casing a flexible shaft having one of its ends connected to the motor shaft, a base fitted within the bottom of the casing, and an electric switch supported by the base adjacent one side thereof, the casing having an opening through which the actuating means of the switch is exposed.

In testimony whereof, I hereunto affix my signature.

AUGUST E. R. BLOMQUIST.